(12) United States Patent
Cheng et al.

(10) Patent No.: US 11,835,466 B2
(45) Date of Patent: *Dec. 5, 2023

(54) DIAMOND CLARITY MEASUREMENT PROCESS AND SYSTEM

(71) Applicant: Goldway Technology Limited, Hong Kong (HK)

(72) Inventors: Ka Wing Cheng, Pak Shek Kok (HK); Kin Wing Wong, Pak Shek Kok (HK); Kong Chan, Pak Shek Kok (HK); Juan Cheng, Pak Shek Kok (HK); Wing Chi Tang, Pak Shek Kok (HK); Koon Chung Hui, Pak Shek Kok (HK)

(73) Assignee: Goldway Technology Limited, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/328,055

(22) Filed: May 24, 2021

(65) Prior Publication Data

US 2021/0364446 A1 Nov. 25, 2021

Related U.S. Application Data

(63) Continuation of application No. 16/959,115, filed as application No. PCT/CN2018/125051 on Dec. 28, 2018, now Pat. No. 11,016,033.

(51) Int. Cl.
*G01N 21/87* (2006.01)
*G06Q 30/02* (2023.01)
(Continued)

(52) U.S. Cl.
CPC ......... *G01N 21/87* (2013.01); *G06Q 30/0244* (2013.01); *G06T 7/0004* (2013.01); *G06T 2207/30108* (2013.01)

(58) Field of Classification Search
CPC .. G01N 21/87; G06Q 30/0244; G06T 7/0004; G06T 2207/30108
See application file for complete search history.

(56) References Cited

U.S. PATENT DOCUMENTS

2005/0187831 A1   8/2005  Gershburg et al.
2006/0244946 A1  11/2006  Underwood
(Continued)

FOREIGN PATENT DOCUMENTS

CN   102596433 A   7/2012
CN   102804759 A   11/2012
(Continued)

OTHER PUBLICATIONS

Cowing, Michael D., "Objective Diamond Clarity Grading", The Journal of Gemmology, vol. 34, No. 4, 2014, pp. 316-332.
(Continued)

*Primary Examiner* — Jamil Ahmed
(74) *Attorney, Agent, or Firm* — Kolisch Hartwell, P.C.

(57) ABSTRACT

A process operable using a computerized system (300) grades the clarity of a diamond (315, 400) as a function of internal defects within its body (315, 400). The computerized system (300) includes an optical image acquisition device (310), a processor module (320) and an output module (340) operably interconnected together. The process includes the steps of (i) acquiring via an optical image acquisition device (310) a plurality of top view images of a diamond (315, 400); (ii) in a processor module (320), detecting defects within the body of the diamond (315, 400); and (iii) from an output module (340), providing a signal indicative of the clarity grade assigned in (ii).

16 Claims, 6 Drawing Sheets

(51) Int. Cl.
*G06T 7/00* (2017.01)
*G06Q 30/0242* (2023.01)

(56) References Cited

U.S. PATENT DOCUMENTS

| | | | |
|---|---|---|---|
| 2010/0086179 A1* | 4/2010 | Verboven | G06T 7/0004 |
| | | | 382/173 |
| 2010/0088348 A1 | 4/2010 | Verboven et al. | |
| 2010/0250201 A1 | 9/2010 | Sivovolenko | |
| 2012/0179290 A1 | 7/2012 | Lo | |
| 2013/0346188 A1 | 12/2013 | Scholz et al. | |
| 2015/0022801 A1 | 1/2015 | Lapa et al. | |
| 2020/0333257 A1 | 10/2020 | Cheng et al. | |

FOREIGN PATENT DOCUMENTS

| | | |
|---|---|---|
| CN | 104697998 A | 6/2015 |
| CN | 107003250 A | 8/2017 |
| JP | S6364037 A | 3/1988 |
| WO | 2018083690 A1 | 5/2018 |

OTHER PUBLICATIONS

Canadian Intellectual Property Office, "Office Action" in connection with related Canadian Patent App. No. 3,087,312, dated Nov. 20, 2020, 8 pgs.

European Patent Office, "Extended European Search Report" in connection with related European Patent App. No. 18893833.6, dated Feb. 10, 2021, 5 pgs.

European Patent Office, "Communication Pursuant to Article 94(3) EPC" in connection with related European Patent App. No. 18893833.6, dated Mar. 30, 2021, 10 pgs.

"International Search Report" and "Written Opinion of the International Searching Authority" in connection with related International App. No. PCT/CN2018/125051, dated Mar. 28, 2019, 10 pgs.

* cited by examiner

DIAMOND CLARITY MEASUREMENT PROCESS AND SYSTEM

CROSS-REFERENCE TO RELATED APPLICATIONS

This application is a continuation of U.S. patent application Ser. No. 16/959,115, filed Jun. 29, 2020, now U.S. Pat. No. 11,016,033, which application is a 371 application of International Application No. PCT/CN2018/125051, filed Dec. 28, 2018, which claims priority to Hong Kong Short-term Patent Application No. 17113980.6, filed Dec. 29, 2017, the disclosures of which are incorporated herein by reference.

TECHNICAL FIELD

The present invention relates to a system and a process for ascertaining clarity of a gemstone. More particularly, the present invention provides a system and a process for ascertaining clarity of a diamond.

BACKGROUND OF THE INVENTION

Diamonds are a key component utilized in luxury goods, in particular in articles of jewelry, and can have a very great value. The value of a diamond depends on several physical properties of the diamond.

There are four globally accepted standards utilized to assess the quality of a diamond, typically known as the 4C's, which are Clarity, Colour, Cut and Carat Weight. By way of example, the Gemological Institute of America (GIA) has a clarity grade as shown in FIG. 4.:

For the assessment on the clarity of a diamond, the quantity, size, and position of the defects within the stone are required to be determined.

From the formation conditions under the earth of a diamond to the human applied processes performed on the diamond, different defects can be formed.

Inside the diamond body, there can be impurities, voids and cracks, which are considered internal defects. On the diamond surface, there can be under-polished irregularities and scratches, which are considered external defects.

These internal and external characteristics are also important with respect to a diamond as they can be one of the unique identifying marks or "birthmarks" that can be used for identifying a diamond.

Currently, the most accepted practices to determine a diamond's clarity is by trained human eyes under 10× microscope. Gemologists are trained for several months by standard samples with different type of defects with a view that a stone when assessed by different people should reproduce the same assessment result.

However, even under standardized training and assessment procedures, the repeatability cannot be guaranteed because of unavoidable subjective human judgement.

Assessment on the same diamond by the same person at different time may also result different clarity grades being applied to the same diamond. Because of human's vision tiredness, different judgement on the same diamond may also be made before and after assessments on many different stones.

Therefore, even for trained and experienced professional gemologists, such gemologists still experience difficultly for providing repeatability in clarity assessment.

OBJECT OF THE INVENTION

It is an object of the present invention to provide a system and a process for ascertaining clarity of a gemstone, in particular a diamond, which overcomes or at least partly ameliorates at least some deficiencies as associated with the prior art.

SUMMARY OF THE INVENTION

In a first aspect, the present invention provides a process operable using a computerized system for grading the clarity of a diamond as a function of internal defects within the body of the diamond, the computerized system including an optical image acquisition device, a processor module and an output module operably interconnected together, said process including the steps of:

(i) acquiring via an optical image acquisition device a plurality of top view images of a diamond with different focus depths corrected with the refractive index of the diamond wherein the focal depths are determined by the height of the diamond and the plurality of top view images are acquired in an environment having a predetermined constant light level, and wherein the top view is defined as a view normal to the table of the diamond and the height of the diamond is defined as the length of a central axis normal to the table of the diamond and passing through the apex of the pavilion of the diamond;

(ii) in a processor module, detecting defects within the body of the diamond, wherein the defect is detected from contrasted changes in pixel brightness levels in comparison with adjacent pixel in each acquired image of said plurality of top view images; applying a penalty score to each detected defect as a function of the geometry, size and location of the defect within the body of the diamond; and assigning a clarity grade based upon a function of the penalty scores; and (iii) from an output module, providing a signal indicative of the clarity grade assigned in (ii).

Preferably the height of the diamond is determined by an optical image acquired via a further optical image acquisition device located normal to the central axis of the diamond. The apparent focus depth $D_{apparent}$ for focusing is preferably corrected according to the formula:

$$D_{apparent} = \frac{D_{real}}{n_{diamond}}$$

wherein $n_{diamond} \approx 2.42$

Preferably the predetermined constant light level is a colour temperature of 6500K.

The plurality of top view images of a diamond are preferably acquired within a system of integrating spheres.

A light source providing predetermined light level is preferably selected from the group including an LED (Light Emitting Diode) light source, a Xenon lamp light source, and incandescent light source, and fluorescent lamp light source, a solar simulator or the like.

Preferably the optical image acquisition device is a digital camera.

The optical image acquisition device may be monochromatic or polychromatic.

In a second aspect, the present invention provides a computerized system for grading the clarity of a diamond as a function of internal defects within the body of the diamond, the computerized system including:

an optical image acquisition device for acquiring a plurality of top view images of a diamond with different focus depths corrected with the refractive index of the diamond wherein the focal depths are determined by the height of the diamond and the plurality of top view images are acquired in an environment having a predetermined constant light level, and wherein the top view is defined as a view normal to the table of the diamond and the height of the diamond is defined as the length of a central axis normal to the table of the diamond and passing through the apex of the pavilion of the diamond;

a processor module for detecting defects within the body of the diamond, wherein the defect is detected from contrasted changes in pixel brightness levels in comparison with adjacent pixel in each acquired image of said plurality of top view images; and for applying a penalty score to each detected defect as a function of the geometry, size and location of the defect within the body of the diamond; and for assigning a clarity grade based upon a function of the penalty scores; and an output module providing a signal indicative of the clarity grade assigned to the diamond.

The processor module may include a data store, said data store including a plurality of data sets indicative of date pertaining to known types of defects of diamonds.

The processor module may be located at a location remote to the optical image acquisition device and the output module, and is in communication with the optical image acquisition device and the output module by way of a telecommunications network.

The computerized system preferably further comprises a light source for providing said predetermined constant light level is a colour temperature of 6500K. The light source may be selected from the group including an LED (Light Emitting Diode) light source, a Xenon lamp light source, and incandescent light source, and fluorescent lamp light source, a solar simulator or the like.

The computerized system preferably further comprises system of integrating spheres, in which the diamond is located when the at least a first optical image is acquired.

The computerized system may further comprise a rotational platform rotatable about said central axis and within the system of integrating spheres, wherein the rotational platform provides for rotation of the diamond about the central axis such that a plurality of optical images of the diamonds can be acquired by the optical image acquisition device.

The optical image acquisition device may be a digital camera.

The optical image acquisition device may be monochromatic or polychromatic.

Preferably, the computerized system further comprises a further optical acquisition device for acquiring an optical image of a side view of the diamond so as to provide for ascertaining the height of the diamond.

BRIEF DESCRIPTION OF THE DRAWINGS

In order that a more precise understanding of the above-recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed.

DETAILED DESCRIPTION OF THE DRAWINGS

The present inventors have identified shortcomings in the manner in which clarity grading of diamonds is performed, and upon identification of the problems with the prior art, have provided a system and process which overcomes the problems of the prior art, and provides a system and process which is more consistent and reliable.

Figure 1:
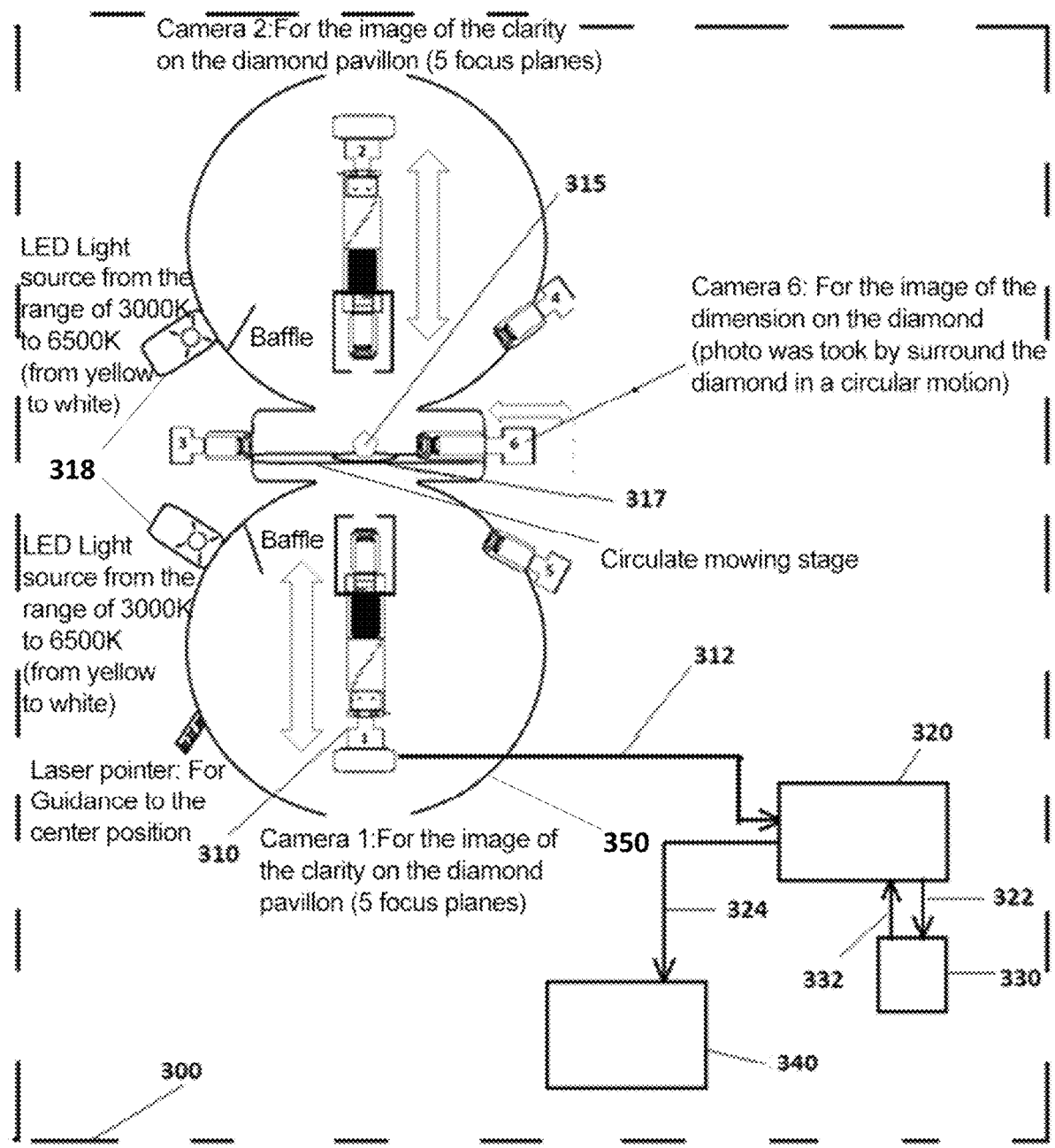
FIG. 1 shows a schematic representation of an embodiment of a system according to the present invention.

Referring to FIG. 1, there is shown a schematic representation of a system 300 in accordance with the present invention. The system 300 includes an optical image acquisition device 310 in communication 312 with a processor module including processor 320, which is in communication 322, 332 with a data store 330 which holds the plurality of data sets pertaining to defects. An output device 340 is provided, which is in communication 324 with the processor 320.

The system 300 includes a system integrating spheres 350, in which the diamond 315 is located when the plurality of optical images are acquired.

The optical image acquisition device 310 is a digital camera device or other device such as a CCD camera or the like, which allows for acquisition of an optical image of a diamond 315

The system 300 includes a light source 318 for providing said predetermined constant light level is a colour temperature of 6500K. The light source is selected from the group including an LED (Light Emitting Diode) light source, a Xenon lamp light source, and incandescent light source, and fluorescent lamp light source, a solar simulator or the like.

The system 300 further includes a rotational platform 317 rotatable about said central axis of the diamond 315 and within the system of integrating spheres 350, wherein the rotational platform 317 provides for rotation of the diamond about the central axis such that a plurality of optical images of the diamonds can be acquired by the optical image acquisition device 310.

Figure 2A:
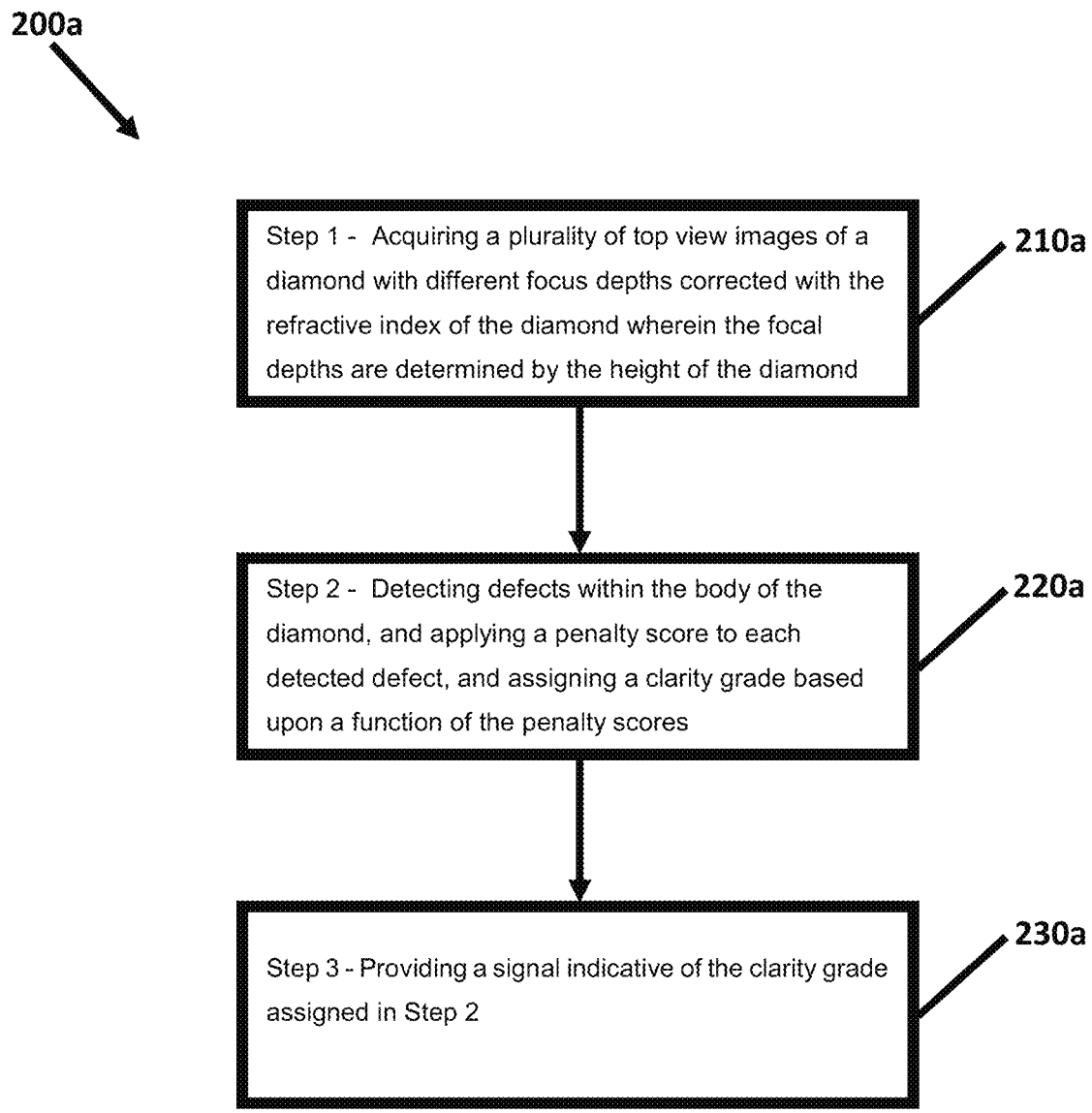
FIG. 2a shows a flow chart of a process according to the present invention.
Figure 2B:
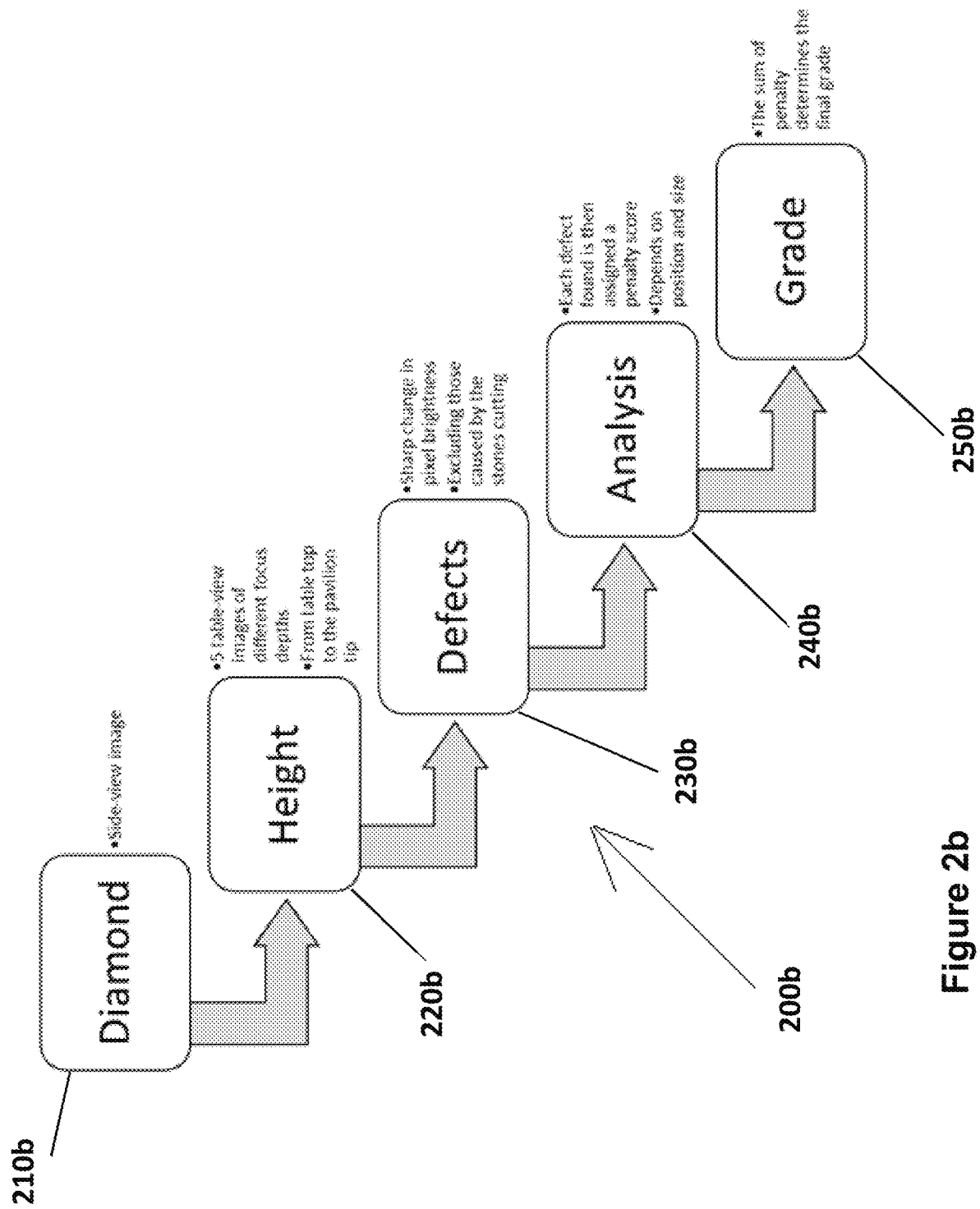
FIG. 2b shows a representation of a flow chart of an embodiment of the process according to the present invention.
Figure 3A:
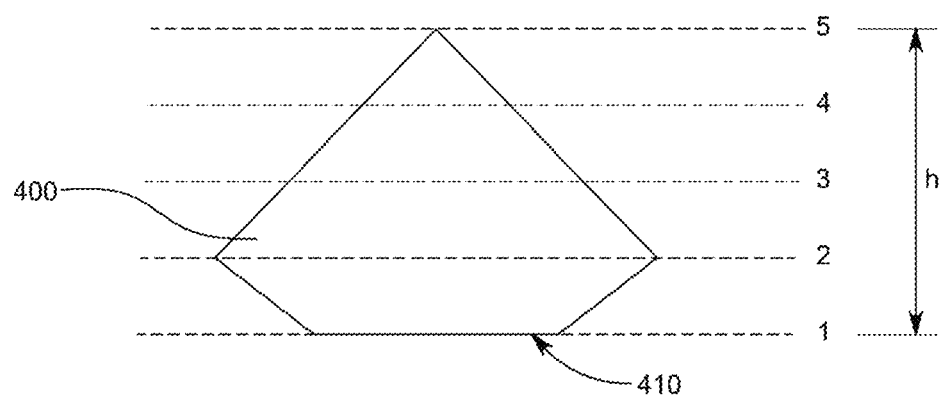
FIGS. 3a, 3b and 3c diagrammatically depicts an embodiment of the process according to the present invention.
Figure 3B:
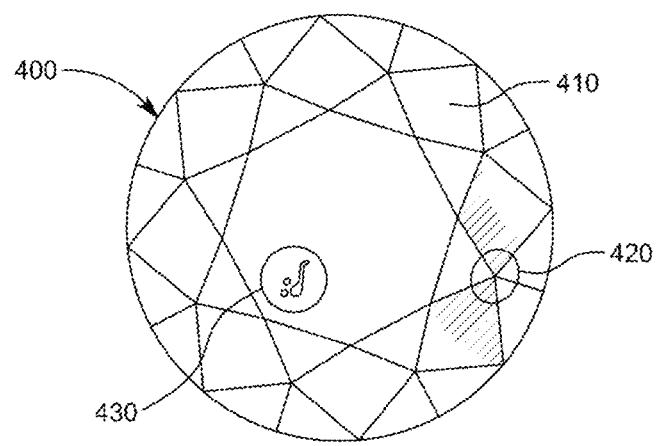
Figure 3C:
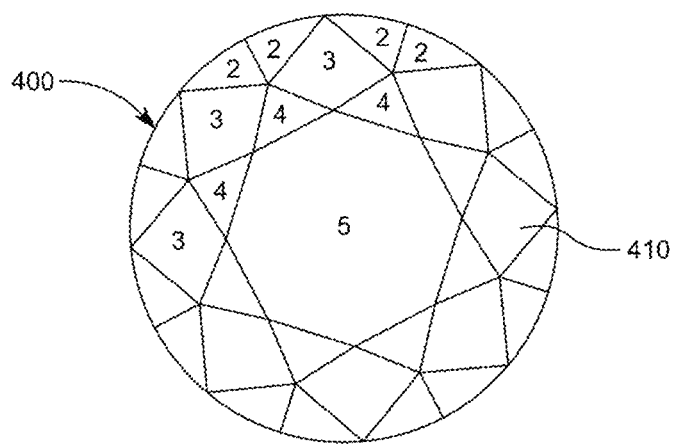
Figure 4:
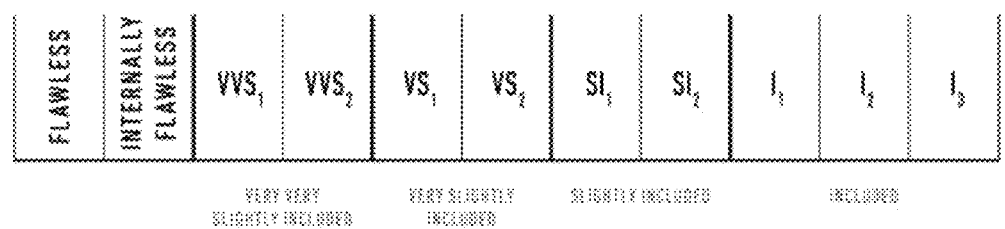
FIG. 4 shows the Gemological Institute of America (GIA) clarity grade.

Referring now to FIG. 2a in which a flow chart of the process 200a of the invention is shown, and FIG. 2b in which a flow chart of an embodiment of the process 200b of the present invention is shown, and to FIGS. 3a, 3b and 3c which depict diagrammatically the process of the present invention, which can be implemented within the system of FIG. 1.

The process 200a of the present invention is operable using a computerized system 300 of FIG. 1 for grading the clarity of a diamond as a function of internal defects within the body of the diamond, whereby the computerized system including an optical image acquisition device, a processor module and an output module operably interconnected together.

The process 200a includes the steps of:

First Step 210a—Acquiring via an optical image acquisition device a plurality of top view images of a diamond with different focus depths corrected with the refractive index of the diamond wherein the focal depths are determined by the height of the diamond and the plurality of top view images are acquired in an environment having a predetermined constant light level.

The top view is defined as a view normal to the table of the diamond and the height of the diamond is defined as the length of a central axis normal to the table of the diamond and passing through the apex of the pavilion of the diamond.

Second Step 220a—In a processor module,
(i) detecting defects within the body of the diamond, wherein the defect is detected from contrasted changes in pixel brightness levels in comparison with adjacent pixel in each acquired image of said plurality of top view images; and
(ii) applying a penalty score to each detected defect as a function of the geometry, size and location of the defect within the body of the diamond; and assigning a clarity grade based upon a function of the penalty scores;

Third Step 230a—From an output module, providing a signal indicative of the clarity grade assigned in (ii).

The height of the diamond may be determined by an optical image acquired via a further optical image acquisition device located normal to the central axis of the diamond.

The apparent focus depth $D_{apparent}$ for focusing is corrected according to the formula:

$$D_{apparent} = \frac{D_{real}}{n_{diamond}}$$

wherein $n_{diamond} \approx 2.42$

With the stone height inferred from the sideview image, a plurality of images of different focus depths of the diamond can be captured perpendicularly to the table for the detection of defects. This may be done by dividing the height of the diamond into corresponding focus depths. However, since the sideview image is captured in air, while the images perpendicular to the table are to be captured in the diamond, the refractive indices difference in air ($n_{air} \approx 1$) and diamond ($n_{diamond} \approx 2.42$) will affect the focus depths determination. Taking an approximation of the light ray's angle of incidence is small with respect to images captured perpendicularly to the table, the apparent depth $D_{apparent}$ for focusing can be corrected as:

$$D_{apparent} = \frac{D_{real}}{n_{diamond}}$$

instead of the real depth Dreal.

The predetermined constant light level is a range of colour temperature of 6500K.

The plurality of top view images of a diamond is acquired within a system of integrating spheres, and the light source providing said predetermined light level is selected from the group including an LED (Light Emitting Diode) light source, a Xenon lamp light source, and incandescent light source, and fluorescent lamp light source, a solar simulator or the like.

Referring now to FIG. 2b, in the embodiment as shown, the following steps are utilised:

Step (i) 210b—a side view of the diamond is acquired;
Step (ii) 220b—multiple table view images are obtained at difference focal depths;
Step (iii) 230b—sharp changes in pixel brightness is determined, excluding those caused by cuts of the diamond; Step (iv) 240b—each defect is assigned a penalty score; and Step (v) 250b—the sum of the penalty scores is utilised to determine the clarity grade of the diamond.

As shown in FIG. 3a, from a side view of the height of the diamond 400, the plurality of images of the table 410 at different focus depths 1 to 5 is shown, corresponding to the first step of the process. The height h of the diamond is determined by the side view, which can be acquired by an image acquisition device, such as a digital camera or CCD camera.

Subsequently, as shown in FIG. 3b, defects are detected within the body of the diamond 400, wherein the defect is detected from contrasted changes in pixel brightness levels in comparison with adjacent pixel in each acquired image of said plurality of top view images, in accordance with the process of the present invention.

However, abrupt changes in brightness caused by the cut of the stone such as at region 420 are exclude and not considered to be a defect, whereas abrupt changes in brightness such as in the middle of a facet such as region 430 are considered a defect.

Subsequently and as is further shown in FIG. 3c, applying a penalty score to each detected defect as a function of the geometry, size and location of the defect within the body of the diamond 400; such as the scores denoted by numbers 2, 3, 4 and 5 as depicted in FIG. 3c, and assigning a clarity grade based upon a function of the penalty scores.

A clarity grade may then be assigned to the diamond 400.

As is shown, to overcome the repeatability and reliability difficulties of the prior art, an embodiment of the process of the present invention using a system of integrating spheres are used to analyze the clarity of diamonds.

Such a process implemented in a machine system, without the problem of vision tiredness of humans, and having algorithm for analyzing the defects, provides an improved and advantageous alternative with high repeatability in comparison with the prior art.

The system and process of the present invention also reduces the cost and time to produce master stone sets and train a professional gemologist. This can also reduce the time to train a professional gemologist in clarity grading.

Due to the visual nature of clarity and inherent variance, the assessment of clarity of a diamond needs to be done in a controlled environment. This makes ensures the lighting conditions and the background for every diamond are the same, as provided by the present invention.

Moreover, the controlled environment must be repeatable at different locations such that people at different location can still have the same assessment on diamond clarity, which the present invention provides.

A system of integrating spheres, as utilized in preferred embodiments of the present invention, assists in playing this role as the light intensity, spectrum and uniformity can be well controlled and repeated, and as such, the system of the present invention can serve and provide for clarity assessment.

In summary, a preferred embodiment of the process of the present invention is as follow:
1. From the sideview camera (camera 3 or 6 as shown in FIG. 1) a photographic representation of the stone height is inferred.
2. With that height information, the table view camera (camera 1 as shown in FIG. 1) will can be utilized to acquire a plurality, for example 5 pictures of different focus depth, which are corrected with the refractive index of diamond, from table top to the pavilion tip as described above.

3. The photographic images of point 2 above is analyzed and defects in the stone located as abnormal pixels in the photographic images are determined. Abnormal refers to sharp change in pixel's brightness level compared to surrounding pixels, excluding those caused by the stones cutting.

4. Each defect found is then assigned a penalty score, depending on its position and size. The sum of penalty determines the final grade of the stone.

The invention claimed is:

1. A process operable using a computerized system for grading the clarity of a diamond as a function of internal defects within the body of the diamond, the computerized system including an optical image acquisition device, a processor module and an output module operably interconnected together, said process including the steps of:
acquiring via an optical image acquisition device a plurality of top view images of a diamond with different focus depths corrected with the refractive index of the diamond, wherein the focal depths are determined by the height of the diamond and the plurality of top view images are acquired in an environment having a predetermined constant light level, wherein the top view is defined as a view normal to the table of the diamond and the height of the diamond is defined as the length of a central axis normal to the table of the diamond and passing through the apex of the pavilion of the diamond, and wherein the height of the diamond is determined by an optical image acquired via a further optical image acquisition device located normal to the central axis of the diamond;
(ii) in a processor module, detecting defects within the body of the diamond, wherein the defect is detected from contrasted changes in pixel brightness levels in comparison with adjacent pixel in each acquired image of said plurality of top view images;
applying a penalty score to each detected defect as a function of the geometry, size and location of the defect within the body of the diamond; and assigning a clarity grade based upon a function of the penalty scores; and
(iii) from an output module, providing a signal indicative of the clarity grade assigned in (ii).

2. The process according to claim 1, wherein the apparent focus depth $D_{apparent}$ for focusing is corrected according to the formula:

$$D_{apparent} = \frac{D_{real}}{n_{diamond}}$$

wherein $n_{diamond} \approx 2.42$.

3. The process according to claim 1, wherein said predetermined constant light level is a color temperature of 6500K.

4. The process according to claim 1, wherein the plurality of top view images of a diamond is acquired within a system of integrating spheres.

5. The process according to claim 1, wherein, a light source providing said predetermined light level is selected from the group including an LED (Light Emitting Diode) light source, a Xenon lamp light source, and incandescent light source, and fluorescent lamp light source, a solar simulator or the like.

6. The process according to claim 1, wherein the optical image acquisition device is a digital camera.

7. The process according to claim 1, wherein the optical image acquisition device is monochromatic or polychromatic.

8. A computerized system for grading the clarity of a diamond as a function of internal defects within the body of the diamond, the computerized system including:
an optical image acquisition device for acquiring a plurality of top view images of a diamond with different focus depths corrected with the refractive index of the diamond, wherein the focal depths are determined by the height of the diamond and the plurality of top view images are acquired in an environment having a predetermined constant light level, and wherein the top view is defined as a view normal to the table of the diamond and the height of the diamond is defined as the length of a central axis normal to the table of the diamond and passing through the apex of the pavilion of the diamond;
a processor module for detecting defects within the body of the diamond, wherein the defect is detected from contrasted changes in pixel brightness levels in comparison with adjacent pixel in each acquired image of said plurality of top view images; and for applying a penalty score to each detected defect as a function of the geometry, size and location of the defect within the body of the diamond; and for assigning a clarity grade based upon a function of the penalty scores;
an output module providing a signal indicative of the clarity grade assigned to the diamond; and
a further optical acquisition device for acquiring an optical image of a side view of the diamond so as to provide for ascertaining the height of the diamond.

9. The computerized system according to claim 8, wherein the processor module includes a data store, said data store including a plurality of data sets indicative of date pertaining to known types of defects of diamonds.

10. The computerized system according to claim 8, wherein the processor module is located at a location remote to the optical image acquisition device and the output module, and is in communication with the optical image acquisition device and the output module by way of a telecommunications network.

11. The computerized system according to claim 8, further comprising a light source for providing said predetermined constant light level is a color temperature of 6500K.

12. The computerized system according to claim 11, wherein the light source is selected from the group including an LED (Light Emitting Diode) light source, a Xenon lamp light source, and incandescent light source, and fluorescent lamp light source, a solar simulator or the like.

13. The computerized system according to claim 8, further comprising system of integrating spheres, in which the diamond is located when the at least a first optical image is acquired.

14. The computerized system according to claim 8, further comprising a rotational platform rotatable about said central axis and within the system of integrating spheres, wherein the rotational platform provides for rotation of the diamond about the central axis such that a plurality of optical images of the diamonds can be acquired by the optical image acquisition device.

15. The computerized system according to claim 8, wherein the optical image acquisition device is a digital camera.

16. The computerized system according to claim 8, wherein the optical image acquisition device is monochromatic or polychromatic.

\* \* \* \* \*